Nov. 21, 1961  K. BELL  3,009,427
MANUFACTURE OF CONFECTION
Filed Sept. 18, 1959
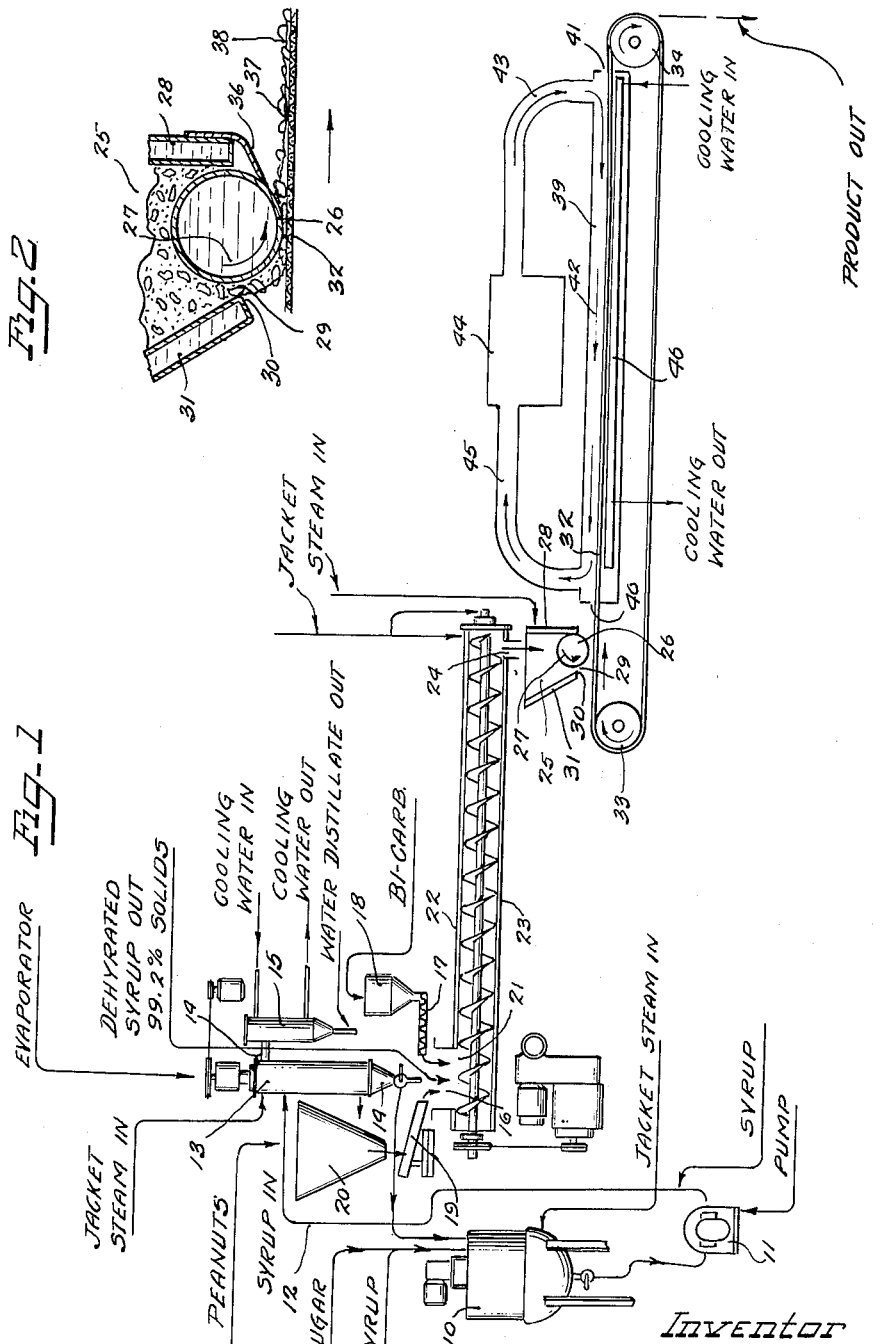
Inventor
KENNETH BELL
By Sanns, Anderson, Luedeka & Fitch
Atty's

3,009,427
MANUFACTURE OF CONFECTION

Kenneth Bell, Marengo, Ill., assignor to National Dairy Products Corporation, New York, N.Y., a corporation of Delaware
Filed Sept. 18, 1959, Ser. No. 840,905
5 Claims. (Cl. 107—54)

This invention relates to the manufacture of a peanut confection generally known as peanut brittle.

The principal object of the invention is to provide a process for manufacturing high quality peanut brittle in which the nut meats are adequately and uniformly distributed through the confection, while at the same time, the nut meats substantially maintain their identity. The candy ingredient is preferably in the form of a sheet or layer which is preferably of a lesser thickness than the dimensions of the nut meats distributed in the layer.

A further object of the invention is to devise a process which is well suited for continuous or substantially continuous mass production of peanut brittle.

In general, the process preferably includes the production of a mixture which includes a plastic syrupy mass in which the nut meats have been thoroughly incorporated at a sufficiently high temperature to maintain the fluidity or plasticity of the mass and to plasticize the nut meats. Before the mass has time to cool, it is spread out in a layer which is thinner than the average dimension of the nut meats, and at the same time, or subsequently but while the mass is still plastic, the layer or sheet, with the incorporated nut meats, is pulled so as to further reduce the thickness of the layer relative to the thickness of the nut meats. The layer so deposited and pulled out is cooled and broken up into smaller sheets or fragments of the desired size for packaging and for sale.

In the drawings which accompanying this application:

FIGURE 1 is a diagram or flow sheet of the process from the beginning where the components such as peanuts, sugar and corn syrup are introduced, and ending with the point where the completed peanut brittle is delivered as a finished product ready for packaging; and FIGURE 2 is an enlargement of a portion of FIGURE 1.

The principal ingredients used in the process, such as peanuts or peanut chunks, sugar and syrup, are conventional, in addition to which there is employed in the process a small percentage of bicarbonate of soda for the purpose of providing peanut brittle of desired characteristics.

Referring to the drawings or flow sheet, it will be seen that the sugar and the syrup are fed, preferably continuously, into a motor driven mixer of a conventional type in which heat is supplied, for example, a device such as a steam jacketed Groen kettle or jacketed mixer 10 is well adapted for the purpose. These two ingredients are thoroughly mixed together in the mixer in which the mixture is heated to a temperature of approximately 240° F., or less. Care should be taken to see that the temperature does not rise too high; otherwise, the mixture will be too viscous to handle well, and it may set up in the pump or feed lines. When the syrup leaves the bottom of the mixer 10, it passes into the inlet of a pump 11 of the positive type which meters the mix and establishes the rate of flow for the operation. A pump well adapted for the purpose is a pump known as a Waukasha Type No. 2BB.

The syrup, when passing through the pump and until it reaches the next step in the operation, is at a temperature of about 240° F., and its solids content is approximately 92 percent.

From the pump 11, the syrup passes through a line 12 into an evaporator 13. This evaporator 13 is steam jacketed and is maintained at a high enough temperature so that when the syrup passes out of the discharge 14, the temperature of the syrup has been increased to about 300° F. to 315° F., and the percentage of solids has gone up from about 92 percent to about 99.2 percent. The evaporator 13 may be of a type known as a Rodney-Hunt machine. The water vapor produced in the evaporator 13 as an incident to the heating step passes out through a duct 14 into a water cooled condenser 15. The condensate flows out of the bottom of the condenser 15, and need not be returned to the system.

The high temperature concentrated syrup which leaves the evaporator 13 through the bottom discharge 14 drops by gravity into a mixing space 16 where it meets a regulated and metered flow of bicarbonate of soda which is delivered through a discharge pipe containing a worm conveyor 17 for delivering a uniform quantity per unit of time. The worm 17 is supplied from a conical bin or reservoir 18. Along with the syrup and the bicarbonate of soda, there is introduced into the mixing space 16 a regulated quantity of nut meats which flow out of the lower end of a feeding trough 19. This trough leads from a conical bin or hopper 20 into the upper end of which the hulled nut meats are introduced. The trough 19 may take the form of a conventional vibrating device. A Snytron vibrating feeder may be used.

The mixture of syrup, peanuts and bicarbonate of soda produced in the mixing space 16 is discharged through an opening 21 in the upper wall of an axially horizontal combination screw conveyor 22. This conveyor is provided with a steam jacket 23 so that while the ingredients are being mixed and propelled to the discharge end, the temperature of the mixture does not fall below about 290° F., at which temperature it leaves the discharge opening 24 at the discharge end of the horizontal screw conveyor 22. From the discharge opening 24 of the screw conveyor, the material drops into a steam jacketed, inclined chute or hopper 25, the bottom end of which contains a stainless steel roller 26. The roller 26 is steam heated to prevent sticking on the roll surface and revolves in the direction of the arrow 27. As shown, the roller 26 almost touches the right hand vertical wall portion 28 of the hopper, to prevent the mixture from disharging at this end. A feeder opening or slot 29 is provided between the roller 26 and the lip 30 at the lower end of the left hand inclined wall 31 of the hopper 25. This feeder opening 29 is so proportioned as to permit free passage of the nut meats (FIGURE 2) and to prevent comminution of the nut meats.

The roller 26, at the bottom of the hopper 25, is located a slight distance above the top stretch of a conveyor belt 32, traveling in the same direction, i.e., to the right hand as shown in the drawing, as the bottom surface of the roller 26. The spacing between the roller 26 and the belt 32 is less than the dimensions of the nut meats which are incorporated in the mixture so that the nut meats are compressed and the syrupy mass is thinner than the nut meats. This compression of the nut meats is not damaging because the prior cooking is such as to plasticize or give the nutmeats resiliency and thereby permit this handling. The imparting of this resiliency to the nut meats and their compression is an important feature of this invention and assures proper proportioning of the height of the nut meats relative to the candy.

While in the illustrated embodiment, the roller 26 presses the mixture against the belt 32, it will be understood that other means may be used.

The pulleys 33 and 34 guide and drive the belt 32 and cause the belt to travel at a speed which is considerably higher, e.g., approximately 50 percent higher, than the peripheral speed of the application roller 26, so that when the layer of peanut brittle mixture is applied to the belt 32, the lower face of the layer will adhere to the belt and will be moved at an increased speed, thus resulting in a drawing out of the plastic mass and reducing the candy thickness to something substantially less than the distance between the roll 26 and the belt 32. However, this pulling of the candy does not squeeze or distort the nut meats, which after compression by the roller substantially return to their initial shape. The result is that instead of producing a sheet of brittle, the opposite surfaces of which are flat, there will be produced a peanut brittle comprising a relatively thin sheet of candy with dispersed peanut meats visibly projecting above the level of the candy.

Although the temperature of the mix, as it leaves the discharge opening 24 of the horizontal conveyor 22, is in the neighborhood of 290° F., the hopper 25 is kept at a temperature of about 260° F., utilizing a steam pressure of between 12 and 15 pounds per square inch (gauge) in its jacket. This reduces the temperature of the mixture as it contacts the roll 26 (see FIGURE 2). In this way, the fluidity of the mix in the hopper 25 is reduced to the proper degree of plasticity to enable the roller 26 to spread the mixture in a uniform layer on the top stretch of the conveyor belt 32. In order to prevent the mixture from building upon the outer surface of the roll 26, thereby impairing the operation of the roll, it is advisable to employ a doctor blade 36 for scraping off any surplus mixture. The scrapings are deposited on the upper surface 37 of the pulled out strip 38 of the brittle and they are united with said upper surface, giving it a somewhat darker appearance than the body of the layer, which darker color is considered desirable from a customer-appeal standpoint.

In order to enable the doctor or scraper blade 36 to function satisfactorily, it is preferably provided with edge or coating of tetrafluorethylene polymer.

Also, in order to obtain a good clean separation of the deposited layer 38 of peanut brittle from the top surface of the belt 32, the latter is preferably made of fiber glass, also coated with tetrafluorethylene polymer. In the operation, it is necessary that when the material is deposited, it sticks to the belt quite tightly to provide the desired stretching but after the stretching, the material should be separable from the surface. The coated fiber glass provides this feature.

Cooling of the brittle after the layer 38 is formed on the belt 32 is effected by propelling the belt 32 with the deposited layer thereon through a chamber or conduit 39 having openings above the belt at each end thereof. The opening 40 at the inlet end and 41 at the discharge end of the cooling conduit 39 are wide enough to permit the layer of material to enter and leave the cooling conduit 39, without damaging the surface of the layer. The cooling conduit 39 accommodates a counter-flow of cool air which is caused to travel in the direction of the arrow 42. Preferably, the circulation is continuous through a closed system comprising an inlet conduit 43 extending between a refrigerator or cooling unit 44, and the cooling chamber 39, the return flow from the left hand end of the cooling chamber being by means of a conduit 45 returning the heated air to the inlet side of the refrigerator unit 44.

In order to avoid the necessity of having too long a cooling chamber 39, and putting too heavy a load upon the refrigerator unit 44, it is desirable to cool the underside of the belt 32 by means of a hollow cooling plate 46 placed within the bottom portion of the cooling conduit 39 immediately below or in contact with the lower surface of the belt 32. This cooling plate 46 is provided with water pasageways extending between the ends thereof, the delivery end of said cooling passages being supplied with fresh cold water at a temperature of about 60° F., the rate of flow being such that the used water flows out of the left hand end of the plate 46 at a temperature of about 62° F.

By the time that the layer of peanut brittle reaches the discharge end 40 of the cooling conduit 42, it has been sufficiently cooled so that it will separate quite freely from the belt 32 and when it passes around the belt roller 34, being no longer flexible or plastic, it will split off into areas of a suitable size for packaging, and then tumble off the belt. It is then packaged and sold without further processing.

It has been found that the peanut brittle, after deposit and prior to cooling, may be scored on the belt 32 to provide an end product of desired shape. The peanut brittle can be broken into such shape as before described.

Various ingredient formulas may be used. In the example described, an excellent product was obtained from the following typical formula:

The syrup ingredient was produced by mixing together sugar and corn syrup, the mixture being heated to 240° F. to produce a flow of syrup containing 92 percent solids at a flow rate of 82 pounds per hour. In the evaporator, when the temperature is raised to about 315° F., the solids percentage is raised to 99.2 percent and the flow rate is reduced to 76 pounds per hour. To this syrup there was added 32 pounds of cleaned and hulled peanut meats per hour. The flow rate of bicarbonate of soda, the other ingredient of the mix, was 500 grams (1.1 pounds) per hour, so that the output was at a rate of about 109 pounds per hour of finished product, ready for packaging.

The method herein described for forming peanut brittle continuously is particularly adapted for providing a product of desired characteristics. It is important in providing such characteristics that the occluded gas formed as a result of the addition of the bicarbonate of soda not be released in handling the mixture and with the process of this invention such occluded gas is not released.

It is also important in providing such characteristics that the nut meats extend above the candy portion of the peanut brittle. This is provided for, as before indicated, by the plasticizing of the nut meats, compressing the mixture of nut meats and syrup upon deposit on the belt, and stretching the candy portion to provide the desired protrusion of the nut meats.

Various of the features of the invention believed to be new are set forth in the appended claims.

I claim:

1. In the manufacture of peanut brittle the process which includes mixing a heated syrup with peanut meats, plasticizing the peanut meats by maintaining the mixture at a temperature which will plasticize said peanut meats, conducting the mixture into a compression zone wherein a layer is formed having a thickness thinner than the dimensions of the nut meats contained therein, depositing said layer onto a supporting surface, propelling said supporting surface at a linear speed substantially greater than the rate of formation of the layer, thereby reducing the thickness of the layer and elongating said layer, then hardening said elongated layer.

2. In the manufacture of peanut brittle the process which includes mixing a heated syrup with peanut meats, plasticizing the peanut meats by maintaining the mixture at a temperature which will plasticize said peanut meats, conducting the mixture into a compression zone wherein a layer is formed having a thickness thinner than the dimensions of the nut meats contained therein, depositing said layer onto a supporting surface, firmly binding said layer to said supporting surface, propelling said supporting surface at a linear speed substantially greater than the rate of formation of the layer, thereby reducing the thickness of the layer and elongating said layer, then hardening said elongated layer.

3. In the manufacture of peanut brittle the process which includes mixing a heated syrup with peanut meats, plasticizing the peanut meats by maintaining the mixture at a temperature which will plasticize said peanut meats, conducting the mixture into a compression zone wherein a layer is formed having a thickness thinner than the dimensions of the nut meats contained therein, depositing said layer onto a supporting surface by rolling said mixture onto said surface to thereby avoid comminution of the nut meats, firmly binding said layer to said supporting surface, propelling said supporting surface at a linear speed substantially greater than the rate of formation of the layer, thereby reducing the thickness of the layer and elongating said layer, then hardening said elongated layer.

4. In the manufacture of peanut brittle the process which includes mixing a heated syrup with peanut meats, plasticizing the peanut meats by maintaining the mixture at a temperature which will plasticize said peanut meats, conducting the mixture into a compression zone wherein a layer is formed having a thickness thinner than the dimensions of the nut meats contained therein, depositing said layer onto a supporting surface by rolling said mixture onto said surface to thereby avoid comminution of the nut meats, firmly binding said layer to said supporting surface, propelling said supporting surface at a linear speed substantially greater than the rate of formation of the layer, thereby reducing the thickness of the layer and elongating said layer, then hardening said elongated layer by cooling said layer, and releasing said layer from said supporting surface.

5. In the manufacture of peanut brittle the process which includes mixing a heated syrup with peanut meats, plasticizing the peanut meats by maintaining the mixture at a temperature which will plasticize said peanut meats, adding a gas-producing compound to said mixture, conducting the mixture into a compression zone wherein a layer is formed having a thickness thinner than the dimensions of the nut meats contained therein, depositing said layer onto a supporting surface by rolling said mixture onto said surface to thereby avoid comminution of the nut meats, firmly binding said layer to said supporting surface, propelling said supporting surface at a linear speed substantially greater than the rate of formation of the layer, thereby reducing the thickness of the layer and elongating said layer, then hardening said elongated layer by cooling said layer, and releasing said layer from said supporting surface.

References Cited in the file of this patent

UNITED STATES PATENTS

| Number | Name | Date |
|---|---|---|
| 1,432,918 | Steely | Oct. 24, 1922 |
| 1,756,662 | Reed | Apr. 29, 1930 |
| 1,778,537 | Steely | Oct. 14, 1930 |
| 1,915,528 | Haug | June 27, 1933 |
| 2,113,575 | Decker | Apr. 12, 1938 |
| 2,197,919 | Bowman | Apr. 23, 1940 |
| 2,507,477 | MacDonald et al. | May 9, 1950 |
| 2,648,297 | Cloud | Aug. 11, 1953 |